United States Patent [19]

Lindbergh

[11] 4,086,875
[45] May 2, 1978

[54] GRADING LIVE FISH UNDER WATER

[75] Inventor: Jon Morrow Lindbergh, Bainbridge Island, Wash.

[73] Assignee: Union Carbide Corporation, New York, N.Y.

[21] Appl. No.: 724,088

[22] Filed: Sep. 16, 1976

[51] Int. Cl.² .................. A01K 75/00; B07B 13/04
[52] U.S. Cl. .......................................... 119/3; 43/105; 209/99
[58] Field of Search ............... 119/3; 209/99; 43/100, 43/101, 102, 103, 104, 105, 14

[56] References Cited

U.S. PATENT DOCUMENTS

| | | | |
|---|---|---|---|
| 132,476 | 10/1872 | Livaudais | 43/105 |
| 405,713 | 6/1889 | Lugrin et al. | 119/3 |
| 1,336,356 | 4/1920 | Johnson | 43/105 |
| 1,361,691 | 12/1920 | Davis | 43/6.5 |
| 1,453,135 | 4/1923 | Hermanson | 43/100 |
| 1,610,350 | 12/1926 | Anderson et al. | 209/394 |
| 1,640,990 | 8/1927 | Hinton et al. | 43/100 |
| 2,396,305 | 3/1946 | Toft | 214/14 |
| 2,643,481 | 6/1953 | Ederer | 43/105 |
| 2,690,158 | 9/1954 | Petty | 119/3 |
| 2,736,121 | 2/1956 | Kimmerle | 43/6.5 |
| 3,096,600 | 7/1963 | Gwyther | 119/3 X |
| 3,204,605 | 9/1965 | Vroman | 119/3 |
| 3,314,184 | 4/1967 | Lerch | 43/4.5 |
| 3,833,119 | 9/1974 | Brown | 209/99 |
| 3,951,104 | 4/1976 | Neff | 43/100 |

Primary Examiner—Hugh R. Chamblee
Attorney, Agent, or Firm—Owen, Wickersham & Erickson

[57] ABSTRACT

Underwater fish grading may be done in a fish pen defined by a rectangular floating walkway. A flexible net in the pen is supported at its perimeter by the walkway or by support members thereon, and a pair of spaced-apart rigid members bridge the pen, each end resting on suitable support means. Below that, a belly rope is passed below the net. A grading barrier, suspended from the rigid members, has a horizontal cross-member held well above water level. An arcuate rim secured to both ends of the cross-member extends down in a vertical plane, and a series of vertical rods extend between and are secured to both the rim and the cross-member, the rods being evenly spaced apart to define grading passages between successive rods. In cross section, the rim defines an exterior channel, and the flexible net is brought into snug contact with the exterior channel by means of the belly rope and is then anchored near the ends of the rim. Fish can swim from one portion of the pen to the other only if they can swim through the grading passages.

26 Claims, 8 Drawing Figures

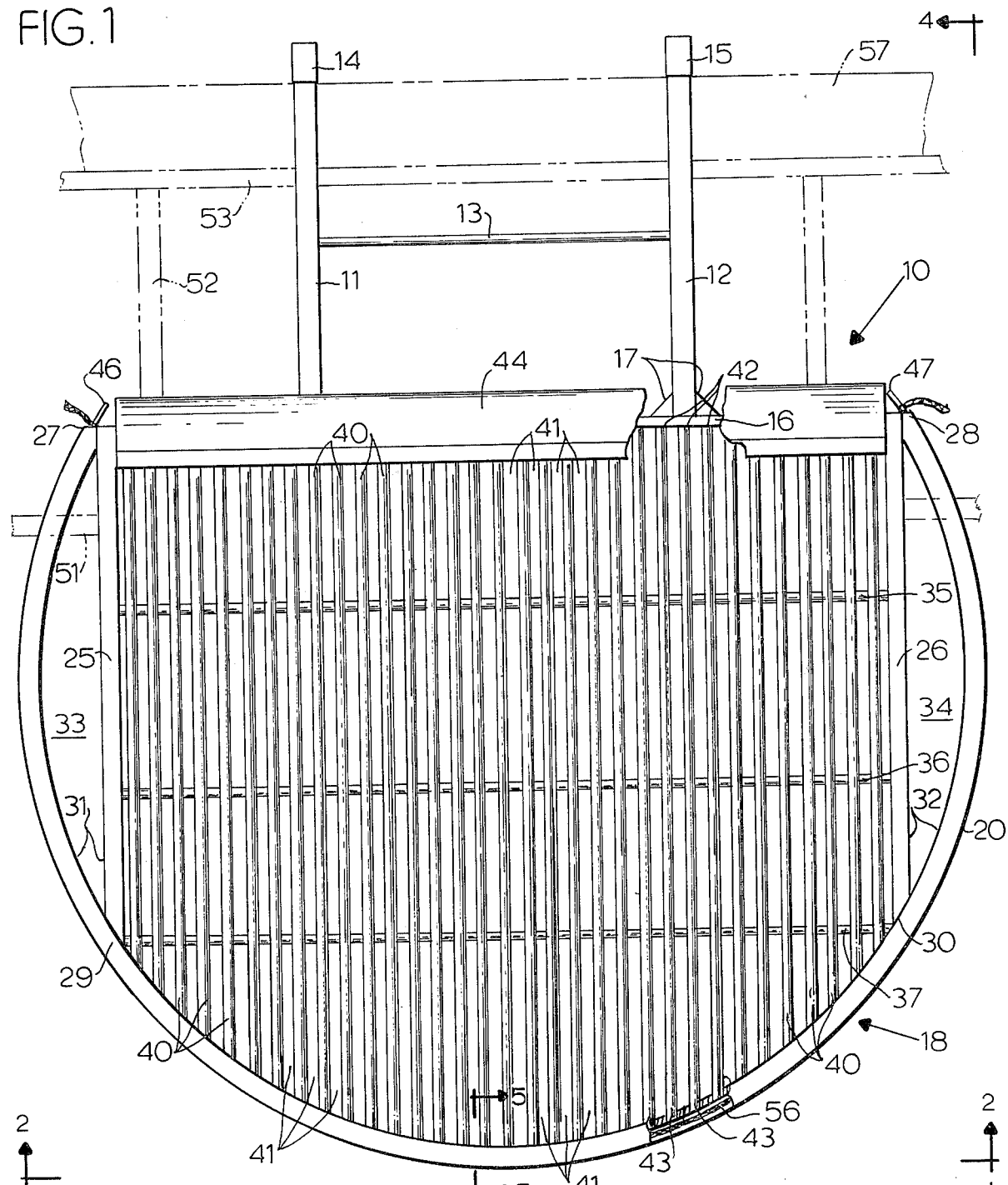
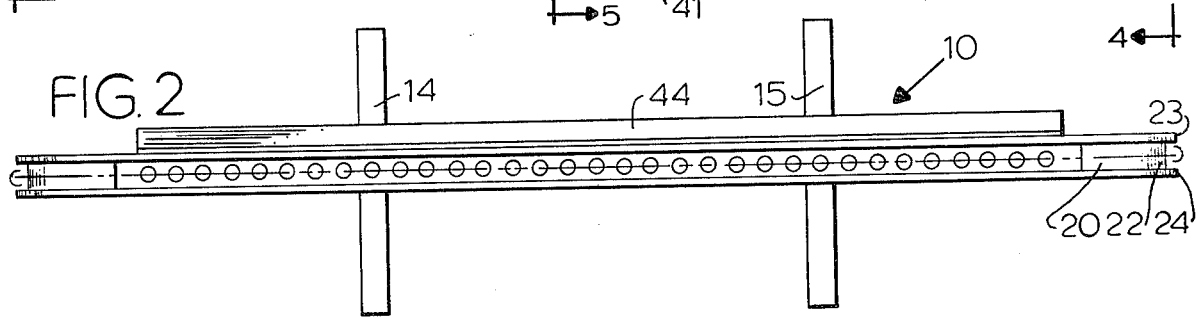

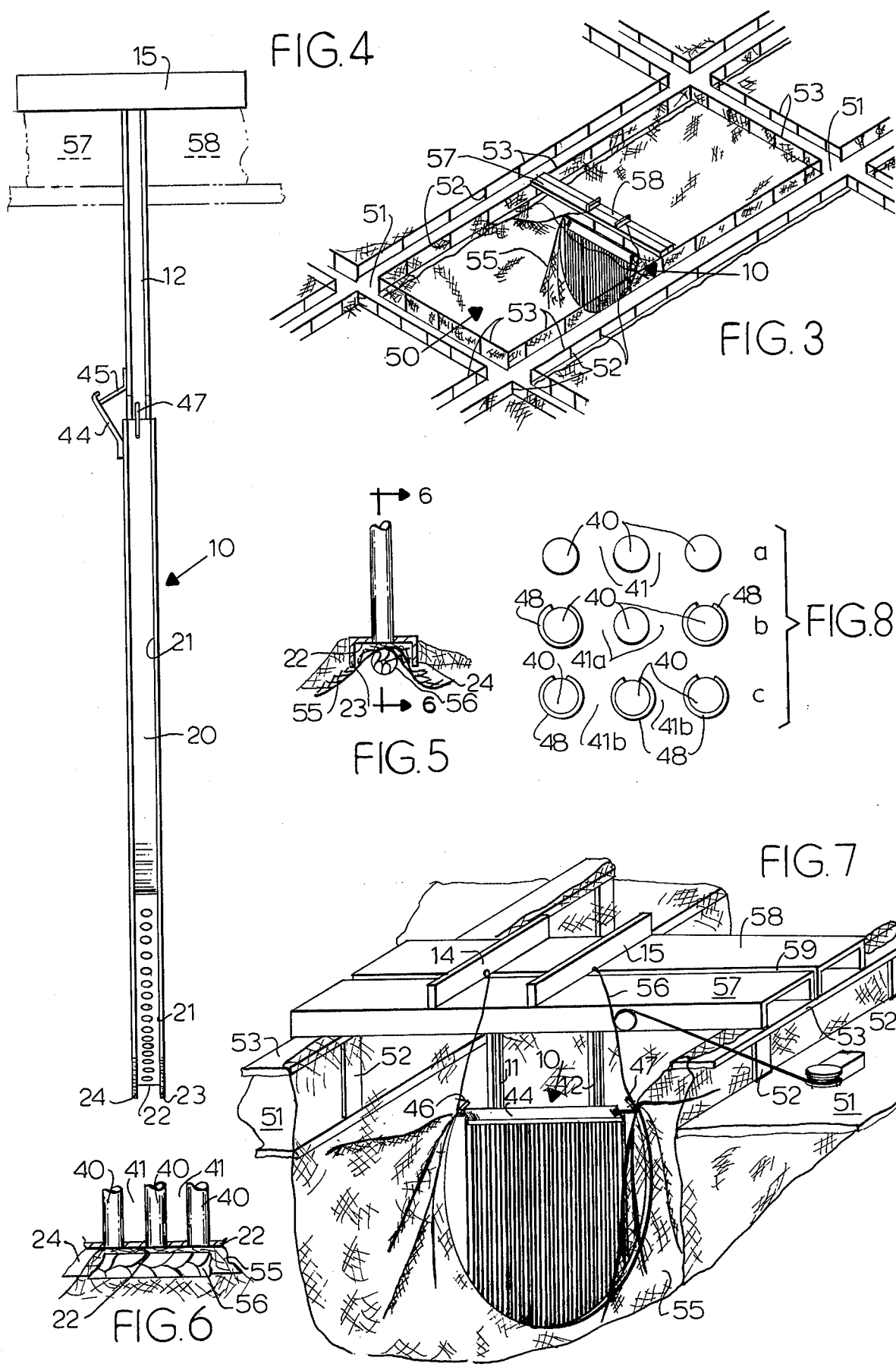

GRADING LIVE FISH UNDER WATER

BACKGROUND OF THE INVENTION

This invention relates to the underwater grading of live farm-grown fish. It has both method and apparatus aspects.

Live fish are graded in order to separate them by size into two groups, or by repetitive grading, into several groups by size.

Several systems have been used for grading live fish that are raised in enclosures, but all these systems have had serious disadvantages or were narrowly limited in their use.

For example, one widely used fish grader requires that a group of fish be taken out of the water, placed into a box having grading openings in its bottom wall, and the box shaken. Fish smaller than a certain size fall out into a pool; then larger are dumped from the box into a different pool. The procedure is hard on the fish; it increases their susceptibility to disease, and may even result in damage to them which reduces their marketability. At the very best, it gives the fish a shock which results in their temporarily losing their appetite and in abnormal action by them after grading.

In another box-type grader, the bottom of the box comprises a series of spaced-apart grading bars. This grader may either be lifted out of the water after the fish have entered it, or it may be left in the water to allow small fish to swim out through the bars. In either case it is inefficient, since it requires that fish be forced into the box in some manner.

Rigid bar graders have sometimes been custom designed as a rectangular grate to be permanently or removably installed in concrete raceways for underwater grading. A seal, to prevent the fish from swimming around the grader, is achieved by designing a channel in the raceway walls into which the ends of the grader fit snugly. Such graders require the close cooperation of the concrete raceways, and they are not, therefore, feasible to install in fish pens of the type where the pen is formed largely by close-mesh flexible netting that is held within a rectangular floating enclosure in a bay or other body of water.

Adjustable rectangular bar graders have also been made wherein the frame and bars were fixed by single pins that allowed the grader to be distorted into a parallelogram. As the grader was distorted into an increasingly acute parallelogram, the spaces between the bars were reduced to provide adjustability. However, it was difficult to prevent the fish from swimming around such a grader.

In some graders, a net was permanently sewed to the perimeter of the grader. Such structures might have the configuration of a net box grader or a seine net with a bar grader sewn in. However, this meant that the grader had to be sewn to the flexible net each time it was used and then disconnected from it after use, or that the grader could be used only with one particular net. Neither of these alternatives is practical for commercial fish pens.

Basically, the present invention is directed to a grading system in which live fish in fish pens can be graded underwater without seriously stressing them or upsetting their feeding, while making it impossible for the fish to swim around or jump over the grading barrier.

An object of the invention is to provide improved underwater fish grading that is easier on the fish than previous systems.

Another object of the invention is to provide underwater fish grading that is readily adaptable to the types of nets that are used in flexible fish pens.

Another object of the invention is to make it easy to adjust to a variety of the sizes of grading.

A further object of the invention is to provide a grading apparatus which does not need to be permanently set in place, or set in place at only one location, but which can be moved from place to place.

SUMMARY OF THE INVENTION

The grading done in the present invention is typically done in fish pens of the type in which a rectangular floating structure with a series of walkways define a series of rectangular enclosures. In each enclosure a flexible net is so supported that it sags down into the water well below the water level. The fish are confined in that net.

In using the present invention, the net is controlled by a belly rope that is passed under the net from one side of the pen to the other, and a novel grading device is supported above the belly rope by a pair of rigid members, such as painter's scaffolds, which are placed so that they bridge the pen, resting on suitable support means at each end.

The novel grading device of this invention comprises (1) a grading barrier having a periphery against which the net can be brought and (2) a support structure by which the grading barrier can be suspended in the pen. The support structure may be a pair of parallel, spaced apart vertical bars having horizontal parallel cross bars, both of which rest on the two rigid members, so that the grader is suspended from the rigid bridging members. At their lower ends, the two vertical bars are connected to the grading barrier. This may be circular, or it preferably includes a horizontal cross-member, to which the vertical members are secured, and an arcuate rim that extends down in a vertical plane from each end of the cross-member. As a result, in such a structure the horizontal cross-member defines a chord across the arc defined by the arcuate member. Usually this arc is circular and preferably it is somewhat greater than a semicircle. The arcuate rim is preferably channel-shaped in cross section to provide an exterior channel between a pair of outwardly facing edge portions. A series of vertical rods extend between and are secured to both the rim and the cross-member. The rods are evenly spaced apart to define identical grading passages between successive rods. Fish that are narrower than the passages can swim through them, but fish wider than the spacing between the rods cannot swim through. In addition, there may be a plurality of spaced-apart horizontal members that aid in the process of attaching the net to the grader.

By using the belly rope, the flexible net of the fish pen can be brought up into snug contact with the rim in the exterior channel of the rim, the belly rope holding it in the channel. When the net is snug it is then secured to anchor means at each end of the rim, and the belly rope is also secured to the grader. With the cross-member located well above the water level, it is unlikely that the fish can jump over it. However, a preferred form of the invention provides a baffle secured to the cross-member and extending out at an angle from the vertical plane of the rim, and the baffle further reduces the chance of fish jumping over the grader.

Thus the pen is divided in two by the grading barrier, and the fish can get from one portion of the pen to the other only if they can swim through the grading passages. The net may be manipulated during emplacement of the grader, or just before emplacement, so that all the fish lie initially to one side of the grader. The end of the net portion containing all the fish can be lifted up to increase the density of fish in the remaining space of that portion, thereby motivating the fish to attempt to swim through the grader to the empty portion, but only the small fish can get through, leaving the large fish behind.

The size of the passage can easily be adjusted, even when the rods are permanently put in place, by using split plastic tubes. More than one thickness of tube can be used, and with each thickness of tube, the distances between bars can be changed. Thus, with only one thickness, three sizes of passages are obtainable: one in which there are no split tubes on the bars, one in which they are inserted only over every other rod, and a third in which they are inserted over every rod.

Other objects and advantages of the invention will appear from a description of a preferred embodiment.

A BRIEF DESCRIPTION OF THE DRAWINGS

In the drawings:

FIG. 1 is a view in front elevation of a grader embodying the principles of the invention. Some parts have been broken away either to show parts normally not seen or to show parts in section, and anchored end portions only of a net are shown. In broken lines are shown portions of the walkway, the railing and the rigid members from which the grader is suspended in a fish pen.

FIG. 2 is a bottom view, viewing FIG. 1 from the line 2—2.

FIG. 3 is a small-scale fragmentary view of a group of fish pens, showing only one fish pen completely and showing that one with the grading barrier in place to perform grading.

FIG. 4 is a view in end elevation of the grader of FIG. 1, looking along the line 4—4 in FIG. 1.

FIG. 5 is a view in section taken along the line 5—5 in FIG. 1.

FIG. 6 is a view in section taken along the line 6—6 in FIG. 5.

FIG. 7 is a fragmentary isometric view of the grader installed for grading in a fish pen.

FIG. 8 is a view showing how split tubes may be used in different manners.

DESCRIPTION OF A PREFERRED EMBODIMENT

The drawings show a grader 10 and show how this grader 10 is used.

The grader 10 may be made entirely from a light, strong aluminum alloy and comprises a pair of vertically extending bars 11 and 12 which may be joined together at their mid-points by a reinforcing rod 13. At the upper end of each bar 11 and 12 is a suspension member 14, 15 which extends out perpendicularly to the plane of most of the grader 10 and makes it easy to suspend the grader 10 in a fish pen. The lower end of each bar 11, 12 is secured to a horizontal cross bar 16, the connection being strengthened by reinforcing triangular gusset plates 17 shown in FIG. 1. The cross bar 16 forms the upper end of a preferred form of grading barrier 18.

In the barrier 18, an arcuate rim 20 meets each end of the cross bar 16 and defines a circular arc which, preferably, is somewhat greater than a semicircle. The grading barrier could be completely circular, but the form shown is preferable. The rim 20 is shaped to provide an exteriorly facing channel 21 with a circular strip 22 on each side of which is a radially outwardly extending rib 23, 24. Vertical reinforcing members 25, 26 may extend vertically down from the ends of the horizontal cross-member 16 and from the respective ends 27, 28 of the rim to meet the rim 20 at points 29, 30, respectively, and the spaces 31 and 32 in between the members 25, 26 and the rim 20 may be filled with solid reinforcing plates 33 and 34. Horizontal reinforcing rods 35, 36, and 37 may extend across between the members 25 and 26, and, as discussed below, one of them may be used in conjunction with a pole or two to suspend the grader 10 during an early stage of the operation.

A series of identical-diameter vertical rods 40 are set in place to extend vertically from the cross-member 16 to the rim 20. It is important that these rods 40 be quite evenly spaced, since the spaces 41 between the successive rods 40 are what provide the grading. The rods 40 are preferably permanently set in place and welded there, the upper end 42 being secured to the cross-member 16, the lower end 43 being secured to the rim 20, although, if desired the rods 40 may be made removable so that rods of smaller or larger diameter may be set in place. The rigid structure makes the grader 10 more reliable and is preferred.

Preferably, on at least one side of the barrier 10 an upwardly and outwardly sloping baffle 44 is provided, with one edge secured to the cross-member 16, reinforcement being provided by brackets 45 attached to the bars 11 and 12 (FIG. 4). The baffle 44 extends across the full width of the grader 10 and serves to deflect fish that try to jump over the barrier 18. The barrier 18 is always partly out of water, with the upper ends of the grading rods 40 and the cross-member 16 always out of the water, but some fish are able to jump fairly high; so the baffle 44 is a desirable feature.

At each end 27, 28 of the rim 20 is provided a net-anchoring means 46, 47 comprising a small-diameter rod welded to the rim 20.

The spaces 41 between the grading rods 40 can be adjusted to size by the use of a series of split plastic tubular sleeves 48 (FIG. 8) which can be temporarily spread apart and placed over any or all of the rods 40. If none of these split plastic sleeves 48 is inserted in place, the largest size grading passage 41 between successive rods 40 is provided, as in row $a$ of FIG. 8. If every other rod 40 is covered with a plastic sleeve 48 (as in row $b$ of FIG. 8), then the distance between the successive rods 40 is reduced by the thickness of the sleeve 48 to give a smaller passage 41$a$. If every one of the rods 40 is covered with a split tube 48, as in row $c$ of FIG. 8, then the space between them is reduced by twice the thickness of the plastic sleeve 48 to give the still smaller grading passage 41$b$.

In order to explain the use of the grader 10, a typical fish pen 50 will first be described, with reference to FIG. 3 and also to FIGS. 1 and 7. A series of pens may be provided by a floating structure in which rectangular areas are left open while each rectangular area is surrounded by a walkway 51. At the edge of the walkway 51 a series of uprights 52 may be provided, and on top of them there may be a horizontal railing 53, which may be provided with a series of anchors (not shown) for nets 55. The nets 55 may, of course, be anchored by some other system, with or without the railing 53.

A fish net 55 of generally rectangular shape and fairly close mesh is normally supported by the anchor points on the railing 53, and is big enough to sag well down into the pens 50, each pen 50 being surrounded by a walkway 51 and a (in the preferred form shown in the drawing) a railing 53. The fish are reared and are fed while they are confined in these pens 50, being unable to swim out through the net 55, the net 55 having a close enough mesh to retain the fish that are put there. At least one belly rope 56 is available for use in conjunction with the grading operation.

In order to accomplish the grading operation, a pair of rigid members 57 and 58 of suitable length are used to bridge the pen 50. These members 57 and 58 may be painter's scaffolds or girders. They should be relatively light and be readily movable while being rigid enough to support the grading barrier 10.

The installation of the grader 10 begins by passing the belly rope 56 under the net 55, directly below the space between the members 57 and 58 and by raising one end of the net 55 above the waterline to force the fish into the other end of the net 55. The grading barrier 10 is then inserted into the space 59 between the members 57 and 58 and lowered onto the net 55 and the belly rope 56 beneath the net 55. As a result, the bottom of the arcuate rim 20 rests snugly on the raised net 55 and on the belly rope 56 (as in FIG. 5). The grader 10 may be held temporarily in this position by inserting a couple of poles (not shown) beneath one of the horizontal cross members 16, 35, 36, or 37 and resting the poles on and across the rigid members 57 and 58.

Next, the belly rope 56 is further wrapped around the rim 20, and the net 55 can be brought into the channel 21 all around the rim 20, as shown in FIGS. 3, 5, and 7. When this is done and the net 55 is taut, the net 55 is anchored to the projections 46 and 47 which serve to anchor it in place, and then the belly rope 56 is tied while retaining this tautness, preferably to the vertical bars 11 and 12. The poles can then be removed from beneath the cross-member 16, 35, 36 or 37, and, with the net 55 taut about the barrier 18, the grader 10 and the net 55 and rope 56 are lowered into place until the suspension members 14 and 15 rest on the rigid members 57 and 58. As a result, the fish pen 50 is divided into two sections.

The fish now grade themselves. To encourage them to swim from one side of the barrier 18 to the other, the end of the net 55 containing the fish may be lifted partially, to increase the fish density in that portion of the net 55. They can swim to the emptier portion of the net only by passing through the grading passages 41. Fish that are too wide to swim through the passages 41 are unable to go from one portion of the pen 50 to the other.

Since none of the large fish are able to pass through the barrier 18, and since, by crowding the fish, the small fish can be caused to swim through the barrier 18, the two groups of fish can be separated. The net 55 can then be raised to harvest the larger fish, or if it is desired to move the smaller fish from one pen to another that can be accomplished in the apparent manner.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

While a truly arcuate rim is preferable, an arcuate rim can be approximated by a series of straight rim sections joined together by a series of obtuse angles. The idea is to avoid sharp angles, such as right angles, and the word "arcuate" in the claims is intended to include approximations to true arcs by polygonal structure or elliptical structure, and so on.

I claim:

1. A fish grader for use in rectangular floating fish pens with a flexible net supported in said pen by structure on the perimeter of the pen, said pen having a belly rope below said net and extending across said pen and a pair of rigid members resting on supports adjacent said perimeter and bridging said pen well above waterline, said grader comprising:

a pair of parallel spaced-apart vertical bars having horizontal parallel suspension members at their upper end for supporting said grader, as by resting on both said rigid members with said bars extending down vertically in between them, and a fish-grading barrier secured to the lower end of said bars, said barrier having an arcuate rim extending down in a vertical plane, said rim being channel-shaped in cross section to define an exterior channel between a pair of outwardly facing edge portions, said channel being able to receive said belly rope and a portion of the net over the belly rope, a series of vertical rods secured to said rim and being evenly spaced apart to define a series of identical-width grading passages between successive rods, through which fish can swim if they are narrow enough but which bar them if they are wider than the spacing between said rods, and upper end crosswise-extending means for joining side portions of said rim and upper-end portions of said rods together and to said bars, so that a said pen can be divided in two by said grading barrier and so that fish can get from one side of the barrier to the other only if they can swim through said grading passages.

2. The fish-grading barrier of claim 1 having net anchor means on said rim.

3. The fish-grading barrier of claim 1 having a removable split plastic tube covering each said rod, all said tubes being identical in thickness, removability enabling use of every other tube or of none, to provide different even spacings between the successive rods.

4. A fish grader for use in rectangular floating fish pens with a flexible net supported in said pen by structure on the perimeter of said pen, said pen having a belly rope below said net and extending across said pen and a pair of rigid members resting on supports on opposite sides of the pen and bridging said pen well above waterline, said grader comprising:

a pair of parallel spaced-apart vertical bars having horizontal parallel suspension members at their upper end for supporting said grader, as by resting on both said rigid members with said bars extending down vertically between them, a horizontal cross-member secured to the lower end of said bars and joining them together, an arcuate rim secured to both ends of said cross-member and extending down therefrom in a vertical plane, so that said cross-member defines a chord across the arc, said rim being channel-shaped in cross section to define an exterior channel between a pair of outwardly facing edge portions, a series of vertical rods extending between and secured to both said rim and said cross-member, said rods being evenly spaced apart to define a series of identical-width grading passages between successive rods, through which fish can swim if they are narrow enough but which bar them if they are wider than the spacing between said rods, and net anchor means adjacent the ends of said rim, whereby a said net can be brought into snug contact with said rim in said exterior channel by means of a said belly rope, said net being anchored at each end, when snug, to said net anchor means, said belly rope being then secured to said bars, said cross-member being located well above water level, so that a said pen can be divided in two by said grader and so that fish can get from one side of the grader to the other only if they can swim through said grading passages.

5. The fish grader of claim 4 having a baffle plate extending out an angle to the plane of said rim from said horizontal cross-member.

6. The fish grader of claim 4 having a removable split plastic tube covering each said rod, all said tubes being identical in thickness, removability enabling use of every other tube or of none, to provide different even spacings between the successive rods.

7. The fish grader of claim 4 having a plurality of horizontal cross-members spaced apart vertically and secured to said rim.

8. A fish grader for use within a flexible net in grading live fish under water, comprising:
 a fish-grading barrier having a generally arcuate planar rim providing an exterior arcuate channel around an arc,
 a series of vertical rods secured to said rim and said cross-member and being evenly spaced apart to define grading passages between successive rods, through which fish can swim if they are narrow enough but which bar them if they are wider than the spacing between said rods,
 grader-suspension means secured to and extending up from said barrier, and
 net anchor means adjacent to said rim.

9. The grader of claim 8 wherein said grader suspension means includes structure extending vertically up from said horizontal cross-member and support means extending perpendicularly and horizontally from said structure at the upper end thereto.

10. The grading barrier of claim 8 having a fish-deflecting baffle strip extending outwardly and upwardly from said horizontal cross-member.

11. A fish grader for use within a flexible net in grading live fish under water, comprising:
 a generally arcuate planar rim joined at both ends to a horizontal cross-member defining a chord thereacross, said rim providing an exterior channel around an arc,
 grader-suspension means extending up from said cross-member,
 a series of vertical rods extending between and secured to both said rim and said cross-member, said rods being evenly spaced apart to define grading passages between successive rods, through which fish can swim if they are narrow enough but which bar them if they are wider than the spacing between said rods, and
 net anchor means adjacent the ends of said rim.

12. The grader of claim 11 wherein said grader suspension means includes structure extending vertically up from said horizontal cross-member and support means extending perpendicularly and horizontally from said structure at the upper end thereto.

13. The grader of claim 11 having a plurality of horizontal cross-members spaced apart from each other vertically and from said first-mentioned cross-member and below it, bridging across said rim.

14. The grading barrier of claim 11 having a fish-deflecting baffle strip extending outwardly and upwardly from said horizontal cross-member.

15. A live-fish grading barrier, comprising:
 a horizontal cross-member,
 an arcuate rim secured to both ends of said cross-member and extending down therefrom in a vertical plane over an arc greater than a semicircle and with said cross-member defining a chord across the arc, said rim being channel-shaped in cross section to define an exterior channel between a pair of outwardly facing edge portions,
 a pair of reinforcing bars extending down vertically from the junctures of said cross-member and rim to said rim,
 plates filling the space between said reinforcing bars and said rim,
 a series of reinforcing rods parallel to said cross-member extending from one said reinforcing vertical bar to the other,
 net anchor means adjacent each end of said rim,
 a series of vertical rods extending along a plane between and secured to both said rim and said cross-member, said rods being evenly spaced apart to define grading passages between successive rods, through which fish can swim if they are narrow enough but which bar them if they are wider than the spacing between said rods,
 a pair of parallel spaced-apart vertical bars extending up from said cross-member, and
 a horizontal parallel cross-bar perpendicular to the plane of said vertical rods at the upper end of each said vertical bars.

16. The barrier of claim 15 having a horizontal outwardly and upwardly tilted baffle plate secured to said cross-member.

17. The barrier of claim 15 having a series of split plastic tubes for encircling said vertical rods and changing the distance between them.

18. Fish-grading apparatus, including in combination:
 a fish pen encircled by a walkway having elevated support means,
 a flexible close-mesh net in said pen supported at its perimeter by said elevated support means,
 rigid support means bridging said pen, resting at each end on said elevated support means and freely movable relative thereto,
 a belly rope below said net and below said rigid support means, extending from one side of said pen to the other, and
 a grader having
  barrier suspension means for engaging said rigid support means so that said grader is suspended therefrom, and a grading barrier, said barrier comprising a generally arcuate rim extending down in a vertical plane, said rim having ends and being channel-shaped in cross section to define an exterior channel, a series of vertical rods secured to said rim, said rods being evenly spaced apart to define grading passages between successive rods, through which fish can swim only if they are narrow enough, net anchor means adjacent to the ends of said rim, and upper-end crosswise extending means for joining together the ends of said rim and said rods and securing to lower portions of said barren suspension means, so that said net can be brought into snug contact with said rim in said exterior channel by means of said belly rope, said net, when snug, being anchored to said anchoring means, said belly rope then being secured to said grader, so that said pen is divided in two by said grading barrier, so that fish can get from one portion of the pen to the other only if they can swim through said grading passages.

19. The apparatus of claim 18 wherein said rigid support means comprise a pair of rigid members and said barrier suspension means comprises a pair of vertical members extending up from said barrier and horizontal bars at their upper ends for resting on said rigid members, with said vertical members extending down between said rigid members.

20. Fish-grading apparatus, including in combination:
a fish pen encircled by a walkway with a raised railing, a flexible close-mesh net in said pen supported at its perimeter by said railing, rigid support means bridging said pen, resting at each end on said railing and freely movable relative thereto, a belly rope below said net and below said rigid support means, extending from one side of said pen to the other, and a grader comprising
a grading barrier and
barrier suspension means for engaging said rigid support means so that said barrier is suspended therefrom, said barrier having a horizontal cross-member secured to the bottom of said barrier suspension means and joining them together well above the water level in said pen, a generally arcuate rim secured to both ends of said cross-member and extending down therefrom in a vertical plane, so that said cross-member defines a chord across the arc defined by said rim, said rim being channel-shaped in cross section to define an exterior channel, a series of vertical rods extending between and secured to both said rim and said cross-member, said rods being evenly spaced apart to define grading passages between successive rods, through which fish can swim only if they are narrow enough, and net anchor means adjacent to the ends of said rim, so that said net can be brought into snug contact with said rim in said exterior channel by means of said belly rope, said net, when snug, being anchored to said anchoring means, said belly rope then being secured to said grader, so that said pen is divided in two by said grading barrier, so that fish can get from one portion of the pen to the other only if they can swim through said grading passages.

21. The apparatus of claim 20 wherein said arcuate rim extends over an arc greater than a semicircle and wherein vertical reinforcing members extend down in chords from ends of said cross-member, the space between these vertical chords and the arcuate rim being filled.

22. The apparatus of claim 20 wherein said rigid support means comprises a pair of rigid members and said barrier suspension means comprises a pair of vertical members extending up from said cross-member and horizontal bars at their upper ends for resting on said rigid members, with said vertical members extending down between said rigid members.

23. A method of grading fish by their width, comprising the steps of:

placing them in a flexible close-mesh net in a fish pen, comprising a rectangular floating structure, said net being supported at its perimeter by said structure railing and extending down into the water surrounded by said floating structure, passing a belly rope across said pen below said net, placing a pair of rigid members so that they bridge said pen above said belly rope and rest on said structure at each end, the rigid members being spaced apart, and inserting a grading barrier into the space between said rigid members and directly above said belly rope, said barrier having means for supporting it from said rigid members and an arcuate rim extending down in a vertical plane and providing an exterior channel, said barrier having a series of vertical rods extending secured to said rim, said rods being evenly spaced apart to define grading passages through which fish can swim if they are narrow enough but which bar them if they are wider than the spacing between said rods, pulling said belly rope at both ends to bring said net into snug contact with said rim in said exterior channel, anchoring said net at both ends of said rim to hold it in said contact, and tying said belly rope to said barrier so as to maintain the snugness of said net in said channel, said pen thereby being divided in two by said grading barrier, so that fish can get from one portion to another only if they can swim through said grading passages.

24. The method of claim 23 wherein before said inserting step is the step of driving all the fish to one side of said belly rope and wherein after said tying step there is the step of raising the side of the net into which said fish have been driven, whereby the fish that are small enough to swim through the barrier do so because of the crowding, leaving only the larger fish on the other side of the barrier.

25. A method of grading fish by their width, comprising the steps of:

placing them in a flexible close-mesh net in a fish pen, comprising a rectangular floating structure with a perimeter railing above a walkway, said net being supported at its perimeter by said railing and extending down into the water surrounded by said floating structure, passing a belly rope across said pen below said net, placing a pair of rigid members so that they bridge said pen above said belly rope and rest on said railing at each end, the rigid members being spaced apart, and inserting a grading barrier into the space between said rigid members and directly above said belly rope, said barrier having means for supporting it from said rigid members, with a cross-member lying horizontally above the water in said pen and an arcuate rim secured to both ends of said cross-member and extending down therefrom in a vertical plane, said rim providing an exterior channel, said barrier having a series of vertical rods extending between and secured to both said rim and said cross-member, said rods being evenly spaced apart to define grading passages through which fish can swim if they are narrow enough but which bar them if they are wider than the spacing between said rods, pulling said belly rope at both ends to bring said net into snug contact with said rim in said exterior channel, anchoring said net at both ends of said rim to hold it in said contact, and tying said belly rope to said barrier so as to maintain the snugness of said net in said channel, said pen thereby being divided in two by said grading barrier, so that fish can get from one portion to another only if they can swim through said grading passages.

26. The method of claim 25 wherein before said inserting step is the step of driving all the fish to one side of said belly rope and wherein after said tying step there is the step of raising the side of the net into which said fish have been driven, whereby the fish that are small enough to swim through the barrier do so, because of the crowding, leaving only the larger fish on the other side of the barrier.

* * * * *